United States Patent
Omi et al.

(10) Patent No.: US 7,817,837 B2
(45) Date of Patent: Oct. 19, 2010

(54) IMAGE PROCESSING DEVICE AND METHOD

(75) Inventors: Yasuo Omi, Chiba (JP); Osamu Miyazaki, Ibaraki (JP); Tsuyoshi Mitake, Chiba (JP)

(73) Assignee: Hitachi Medical Corporation, Tokyo (JP)

( * ) Notice: Subject to any disclaimer, the term of this patent is extended or adjusted under 35 U.S.C. 154(b) by 1008 days.

(21) Appl. No.: 11/596,231

(22) PCT Filed: May 17, 2005

(86) PCT No.: PCT/JP2005/008930

§ 371 (c)(1), (2), (4) Date: Nov. 13, 2006

(87) PCT Pub. No.: WO2005/110232

PCT Pub. Date: Nov. 24, 2005

(65) Prior Publication Data

US 2007/0230760 A1    Oct. 4, 2007

(30) Foreign Application Priority Data

May 19, 2004    (JP) ............................. 2004-148690

(51) Int. Cl.
   *G06K 9/00* (2006.01)
   *G06K 9/54* (2006.01)
(52) U.S. Cl. ...................... 382/131; 382/307
(58) Field of Classification Search ......... 382/182–132; 378/4, 6

See application file for complete search history.

(56) References Cited

U.S. PATENT DOCUMENTS 4,887,211 A * 12/1989 Thiel et al. .................. 382/131
6,813,335 B2    11/2004 Shinbata

FOREIGN PATENT DOCUMENTS

| JP | 2002-374418 | 12/2002 |
| JP | 2003-76992 | 3/2003 |
| JP | 2003-132352 | * 5/2003 |

OTHER PUBLICATIONS

International Search Report.

* cited by examiner

*Primary Examiner*—Vu Le
*Assistant Examiner*—Amara Abdi
(74) *Attorney, Agent, or Firm*—Cooper & Dunham LLP

(57) ABSTRACT

An image processing device according to the present invention which includes image creating means for creating each of a smoothened image and a sharpened image with respect to at least a part of image data, and mixed image creating means for mixing the smoothened image and the sharpened image created by the image creating means to create a mixed image, including: analysis quantity calculating means for calculating an analysis quantity on plural pixel values in each matrix that surrounds each pixel of the image data and has any matrix size; control means for controlling the mixing ratio between the smoothened image and the sharpened image in the mixed image creating means in accordance with the analysis quantity calculated by the analysis quantity calculating means; and display means for displaying the mixed image that is controlled by the control means and output from the mixed image generating means.

21 Claims, 13 Drawing Sheets

VARIANCE, STANDARD DEVIATION OF ORIGINAL IMAGE

| | 0 | 0.5 | 1 | 1.5 | ... | K | ... |
|---|---|---|---|---|---|---|---|
| 0 | - | W2(0.5,0) | W2(1,0) | W2(1.5,0) | ... | W2(k,0) | ... |
| 0.5 | W2(0,0.5) | - | W2(1,0.5) | W2(1.5,0.5) | ... | W2(K,0.5) | ... |
| 1 | W2(0,1) | W2(0.5,1) | - | W2(1.5,1) | ... | W2(K,1) | ... |
| 1.5 | W2(0,1.5) | W2(0.5,1.5) | W2(1,1.5) | - | ... | W2(K,1.5) | ... |
| 2 | W2(0,2) | W2(0.5,2) | W2(1,2) | W2(1.5,2) | ... | W2(K,2) | ... |
| ⋮ | ⋮ | ⋮ | ⋮ | ⋮ | - | ... | ... |
| K | W2(0,K) | W2(0.5,K) | W2(1,K) | W2(1.5,K) | ⋮ | - | ... |
| ⋮ | ⋮ | ⋮ | ⋮ | ⋮ | ⋮ | ⋮ | - |

DESIRED VARIANCE OR STANDARD DEVIATION

WIENER SPECTRAL DIFFERENCE (NORMALIZED) IN FREQUENCY BAND 1

|   | 0 | 0.1 | 0.2 | 0.3 | ... | K | ... |
|---|---|---|---|---|---|---|---|
| 0 | - | W2(0.1,0) | W2(0.2,0) | W2(.5,0) | ... | W2(k,0) | ... |
| 0.1 | W2(0,0.1) | - | W2(0.2,0.1) | W2(0.3,0.1) | ... | W2(K,0.1) | ... |
| 0.2 | W2(0,0.2) | W2(0.1,0.2) | - | W2(0.30.2) | ... | W2(K,0.2) | ... |
| 0.3 | W2(0,0.3) | W2(0.1,0.3) | W2(0.21,0.3) | - | ... | W2(K,0.3) | ... |
| 0..4 | W2(0,0.4) | W2(0.1,0.4) | W2(0.2,0.4) | W2(0.3,0.4) | ... | W2(K,0.4) | ... |
| ⋮ | ⋮ | ⋮ | ⋮ | ⋮ | - | ... | ... |
| K | W2(0,K) | W2(0.1,K) | W2(0.2,K) | W2(0.3,K) | ⋮ | - | ... |
| ⋮ | ⋮ | ⋮ | ⋮ | ⋮ | ⋮ | ⋮ | - |

WIENER SPECTRAL DIFFERENCE (NORMALIZED) IN FREQUENCY BAND 2

IMAGE PROCESSING DEVICE AND METHOD

TECHNICAL FIELD

The present invention relates to a technique that enhances the signal-to-noise ratio (S/N ratio) of collected image data when images of a subject are collected, and is useful to suppress reduction of the resolution of the collected images.

BACKGROUND ART

Medical images are achieved as follows. Energy such as radiant ray containing X-rays, gamma rays, magnetic waves, ultrasonic waves or the like for measurement is irradiated to a subject (subject being examined), transmission signals or reflection signals of the subject being examined which are achieved by the energy irradiation are subjected to data processing, and the inside of the subject being examined is imaged on the basis of the data processing result.

From the viewpoint of protecting subjects being examined, it has been recently required to reduce the energy to be irradiated to a subject being examined for the purpose of measurement of exposure of X-ray or the like in the measurement of the medical images. On the other hand, high-quality images are required even under irradiation of reduced energy.

Both the requirements are incompatible with each other. As one method of satisfying these requirements is known a technique of removing a noise signal component which is increased due to suppression of the energy for the measurement, thereby enhancing the S/N ratio.

A conventional image processing method is disclosed in [Patent Document 1]. [Patent Document 1] has a step of emphasizing the sharpness of each pixel of first image data to achieve sharpened image data, a step of smoothening each pixel of the first image data to achieve smoothened image data, a step of calculating the edge degree of each pixel of the first image data, a step of setting the correlation between the edge degree and a fusion rate so that the fusion rate of the smoothened image data is increased with respect to the mode value of the calculated edge degree, and an image data fusing step of fusing the sharpened image data and the smoothened image data every pixel on the basis of the correlation between the edge degree and the fusion rate to achieve second image data. According to this method, both the edge enhancement and the particular noise reduction can be effectively compatible with each other.

Patent Document 1: JP-A-2003-132352

DISCLOSURE OF THE INVENTION

Problem to be Solved by the Invention

However, in the technique disclosed in [Patent Document 1], there is considered a case where in the step of calculating the edge degree, original pixel information of the image other than spike noises may be also recognized as a noise at the calculation time, so that the original pixel information thus recognized is removed. Therefore, this technique makes insufficient consideration about the point that the resolution of the image may be reduced.

Means of Solving the Problem

According to the present invention, an image processing device including image creating means for creating each of a smoothened image and a sharpened image with respect to at least a part of image data, and mixed image creating means for mixing the smoothened image and the sharpened image created by the image creating means to create a mixed image, comprises: analysis quantity calculating means for calculating an analysis quantity on plural pixel values in each matrix that surrounds each pixel of the image data and has any matrix size; control means for controlling the mixing ratio between the smoothened image and the sharpened image in the mixed image creating means in accordance with the analysis quantity calculated by the analysis quantity calculating means; and display means for displaying the mixed image that is controlled by the control means and output from the mixed image generating means.

Accordingly, there can be provided an image processing device that can remove noise while suppressing reduction of the resolution of an image.

According to the present invention, an image processing method including image creating step for creating each of a smoothened image and a sharpened image with respect to at least a part of image data, and mixed image creating step for mixing the smoothened image and the sharpened image created by the image creating step to create a mixed image, comprises: analysis quantity calculating step for calculating an analysis quantity on plural pixel values in each matrix that surrounds each pixel of the image data and has any matrix size; control step for controlling the mixing ratio between the smoothened image and the sharpened image in the mixed image creating step in accordance with the analysis quantity calculated by the analysis quantity calculating means; and display step for displaying the mixed image that is controlled by the control step and output from the mixed image generating step.

Accordingly, there can be provided an image processing method that can remove noise while suppressing reduction of the resolution of an image.

EFFECT OF THE INVENTION

According to the present invention, the noise can be removed while suppressing the reduction of the resolution of the image. Furthermore, the mixing ratio between the smoothened image and the sharpened image can be properly determined, so that both the maintenance of the contour of the image data and the noise reduction is effectively compatible with each other and thus an image having a desired analysis quantity can be created.

BEST MODES FOR CARRYING OUT THE INVENTION

Preferred embodiments of an image diagnosis assisting device according to the present invention will be described hereunder in detail with reference to the accompanying drawings.

First Embodiment

Figure 1:
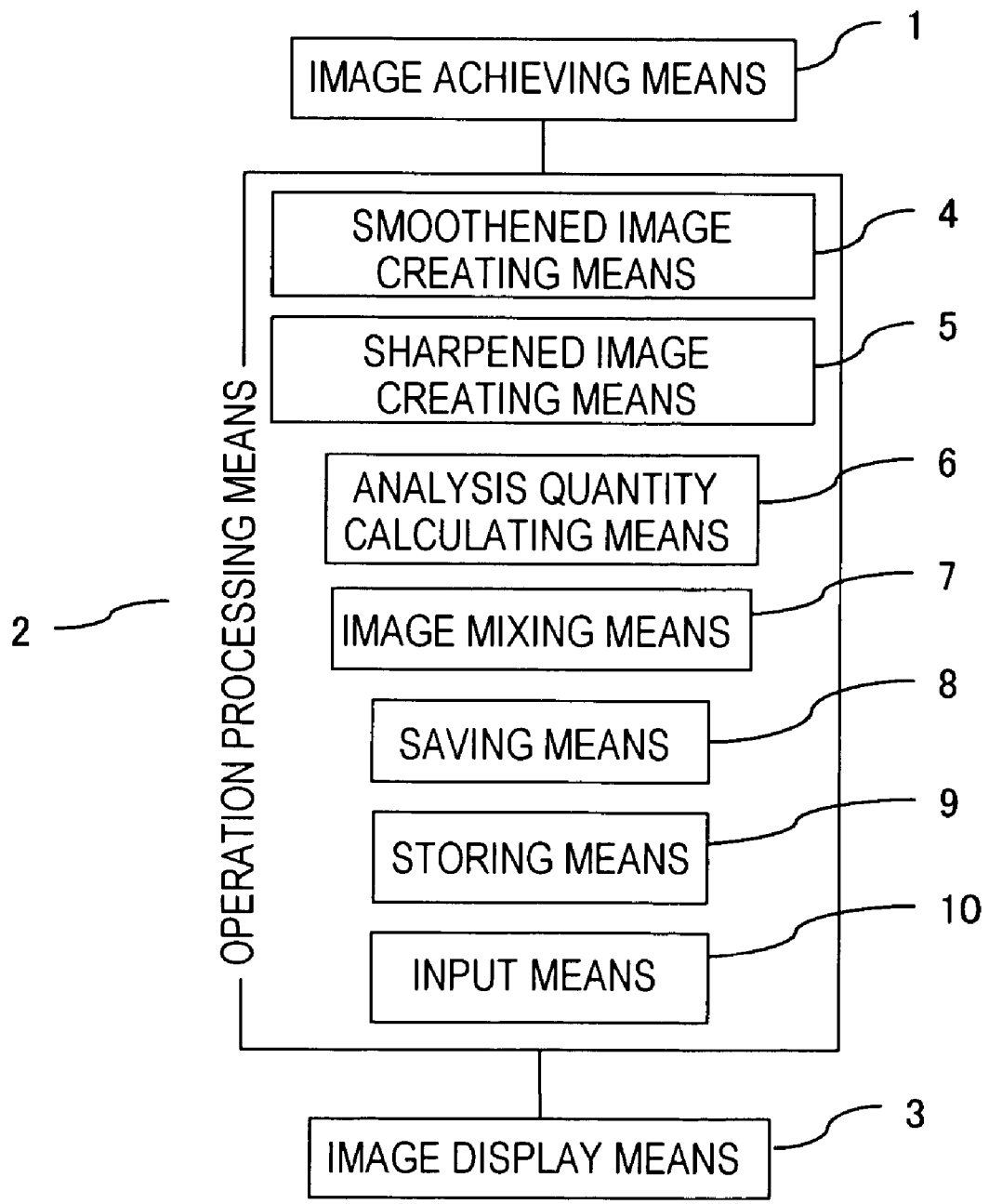
FIG. 1 is a diagram showing the conceptual construction of an image processing device according to the present invention.

FIG. 1 is a block diagram showing an example of the construction of the image processing device according to the present invention.

The image processing device according to the present invention has image achieving means 1, operation processing means 2 connected to the image achieving means 1 so that signals are transmissible therebetween, and image display means 3 connected to the operation processing means 2 so that signals are transmissible therebetween.

The image achieving means 1 is changed in accordance with the type of an image as a processing target. For example, when the image to be processed is medical digital image data of an X-ray perspective image, a CT image, an MR image, an ultrasonic image or the like, the image achieving apparatus thereof is a medical image diagnosis apparatus such as an X-ray apparatus, a CT apparatus, an MR apparatus, an ultrasonic apparatus or the like.

Furthermore, when the image to be processed is digital image data of an image based on a digital camera, an image read out by a scanner or the like, the image achieving apparatus thereof is an image reading device such as a digital camera, a scanner or the like. Images achieved by these image achieving devices contain lots of noise components when the incident light amount is small. Therefore, the method disclosed in this invention an be adopted to remove the noise.

The operation processing means 2 is a computer integrated with the image achieving means 1 or an independent computer provided separately, and it has smoothened image creating means 4, sharpened image creating means 5, analysis quantity calculating means 6, image mixing means 7, saving means 8, storage means 9 and input means 10.

The smoothened image creating means 4 remove noises on an original image to be processed. The sharpened image creating means 5 emphasizes the contour of the original image to be processed. The analysis quantity calculating means 6 calculates the variance value, the standard deviation value, the Wiener spectrum value, etc. of an image. The smoothened image and the sharpened image is mixed with each other by the image mixing means 7 on the basis of the analysis quantity calculated by the analysis quantity calculating means 6. The saving means 8 has a function of storing the smoothened image, the sharpened image and the mixed image and also a function of storing various kinds of programs, and it comprises a hard disk. The storage means 9 has a function of temporarily storing the smoothened image, the sharpened image and mixed image, and it comprises a memory or the like. The input means 10 has a function of inputting various kinds of parameters for actuating the image processing device by an operator, and it comprises a mouse, a keyboard or the like.

Since the image achieving means 1 functions as a computer, it contains at least one of a digital signal processor (DSP), a microprocessor (MPU) and a central processing unit (CPU).

The image display means 3 is a display device such as a display or the like which is integrated with the image achieving means 1 and the operation processing means 2 or any one of them or independently provided.

Figure 2:
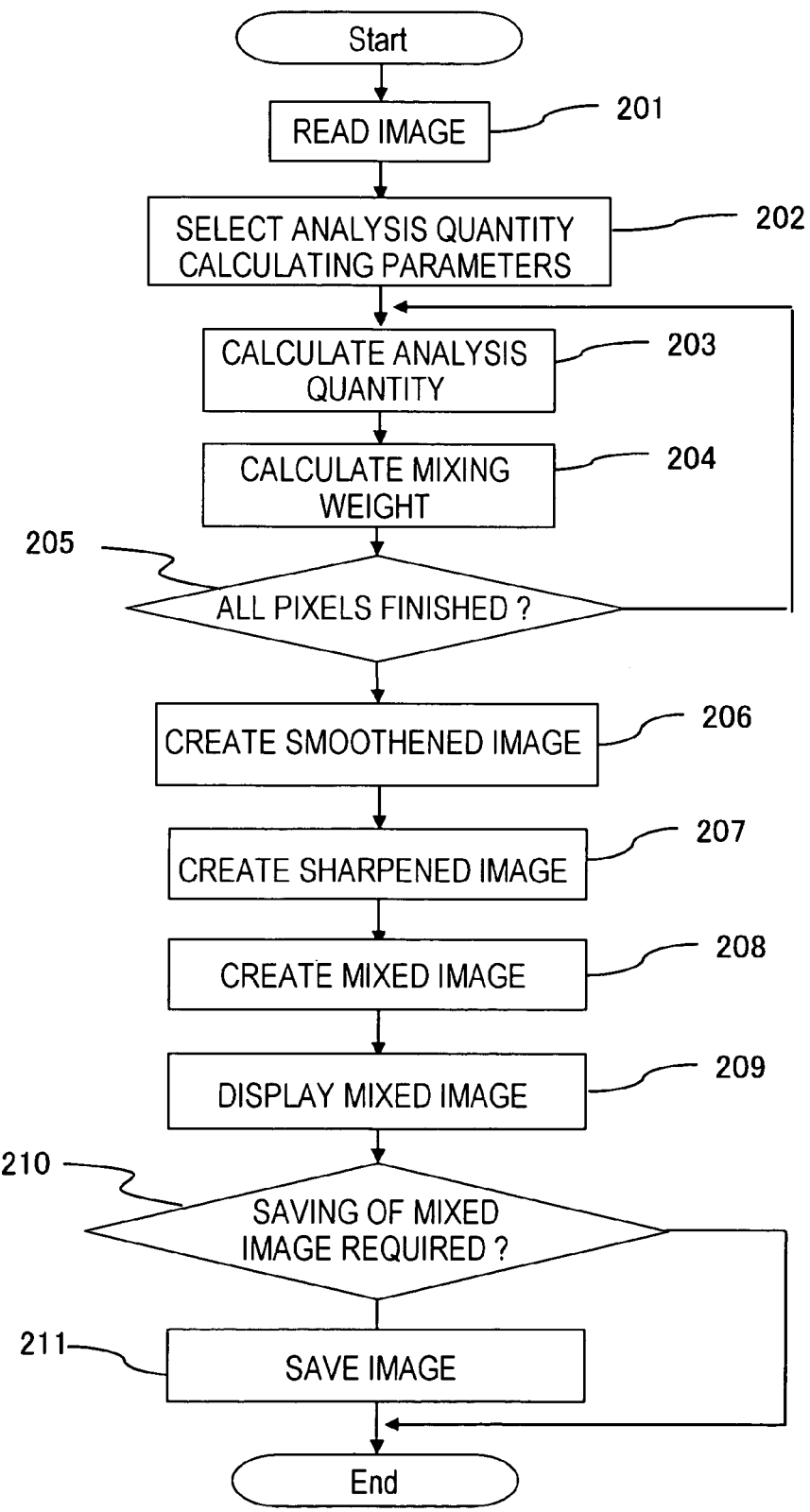
FIG. 2 is a flowchart from image reading till image storage in a first embodiment.

FIG. 2 is a flowchart from data reading till display of an output image in the first embodiment of the image processing device according to the present invention.

In step 201, the image achieving means 1 reads an image to be processed, and the operation processing means 2 stores the read image into the storage means 9.

Alternatively, the operation processing means 2 may read out an image which has been already stored in the storing means 8, and the operation processing means 2 may store the read image into the storage means 9.

The image read at this time may be digital image data which is newly created by an X-ray apparatus, an MR apparatus, a CT apparatus, an ultrasonic diagnosis apparatus, a digital camera or the like, and the type thereof is not limited to a special one. In step 202, an operator (not shown) selects various kinds of parameters for calculating an analysis quantity as an origin of the mixing ratio between the smoothened image and the sharpened image, and inputs the various kinds of parameters thus selected to the operation processing means 2 by using the input means 10.

The parameter contains the type of the analysis quantity and the matrix size. The analysis quantity is a statistical physical amount, and it is calculated on the basis of the pixel values in the matrix and reflects granularity of the image. The type of the analysis quantity is at least one of the variance, the standard deviation, the Wiener spectrum and the differential value of the pixel values in the matrix. The differential value corresponds to a subtraction value between the pixel value of a noted pixel and the pixel values of pixels located around the noted pixel. The matrix size indicates a pixel range in which the analysis quantity is calculated, and for example, it indicates 3×3 matrix or 5×5 matrix around some pixel. Here, the parameters of the type of the analysis quantity and the matrix size may be freely indicated by the user, or set in advance by a program.

The step 202 may be omitted when the parameters are set in advance.

In step 203, the analysis quantity calculating means 6 calculates the corresponding amount on the basis of the parameters determined in step 202.

Here, the variance value, the standard deviation and the Wiener spectrum of the pixel values in the matrix are calculated by a well known calculation method. In step 204, the image mixing means 7 calculates the mixing weight to mix the smoothened image and the sharpened image in accordance with the analysis quantity calculated in step 203. The method of calculating the mixing weight will be described later.

The mixing weight W(x, y) is determined every pixel, the steps 203 to 204 are repeated until the calculation on all the pixels is finished. In step 205, the calculation processing means 2 goes to the next step if the calculation on all the pixels is finished. In step 206, the smoothened image creating means 4 carries out noise removing processing on the original image as the processing target. A well-known smoothening filter such as a moving average filter, an intermediate value filter or the like is usable for the noise removing processing, however, a smoothening filter based on the analysis value described later may be used.

In step 207, the sharpened image creating means 5 executes the edge enhancement processing on the original image to be processed.

A well-known edge enhancement filter such as a sharpening filter using Laplacian (secondary differentiation) or the like may be used for the edge enhancement processing.

In step 208, the image mixing means 8 mixes the smoothened image AIMG(x, y) and the sharpened image BIMG(x, y) on the basis of the mixing weight w(x, y) calculated in step 204 according to the equation (1) to create the mixed image OIMG(x, y)

[No. 1]

$$OIMG(x,y)=W(x,y)\cdot AIMG(x,y)+(1-W(x,y))\cdot BIMG(x,y) \quad \text{(equation 1)}$$

In step 209, the operation processing means 2 displays the mixed image OIMG(x, y) created in step 208 on the image display means 3.

In step 210, the operation processing means 2 makes the operator judge whether it is necessary to store the mixed image. For this judgment, the operation processing means 2 displays a storage acknowledging message on the image display means 3, and the operator judges necessity or non-necessity of the storage according to the above display. When it is necessary to store the mixed image, the operation processing means 2 stores the mixed image in the storing means 8 in step 211.

In the foregoing description of the operation, the processing content has been described in the order of the calculation of the mixing weight, the creation of the smoothened image and the creation of the sharpened image, however, the processing may be executed in random order. That is, the processing order of the processing of steps 202 to 205, the step 206 and the step 207 may be freely changed. The change of the processing order may be freely set through the input means 10 by the operator while the processing order is displayed on the image display means 3.

Furthermore, if the processing capability of the operation processing means 2 is high, the mixing weight calculation, the smoothened image creation and the sharpened image creation may be executed in parallel processing style or in pipeline processing style, so that the operation speed is increased.

Next, an example of the method of calculating the mixing weight when the analysis quantity is variation or standard deviation will be described.

The equation 2 and the equation 3 define the variance D(x, y) and the standard deviation σ(x, y) in M×N matrix with some pixel P(x, y) at the center of the matrix.

[No. 2]

$$D(x, y) = \sum_{i=x-\frac{M}{2}}^{x+\frac{M}{2}} \sum_{j=y-\frac{N}{2}}^{y+\frac{N}{2}} (P(i, j) - \overline{P})^2 / (M \cdot N) \quad \text{(equation 2)}$$

$$\sigma(x, y) = \sqrt{D(x, y)} \quad \text{(equation 3)}$$

$$= \sqrt{\sum_{i=x-\frac{N}{2}}^{x+\frac{M}{2}} \sum_{j=y-\frac{N}{2}}^{y+\frac{N}{2}} (P(i, j) - \overline{P})^2 / (M \cdot N)}$$

An average value of pixel values in the M×N matrix with the pixel P(x, y) at the center of the matrix is defined by the following equation.

[No. 3]

$$\overline{P} = \sum_{i=x-\frac{M}{2}}^{x+\frac{M}{2}} \sum_{j=y-\frac{N}{2}}^{y+\frac{N}{2}} P(i, j)/(M \cdot N) \quad \text{(equation 4)}$$

Figure 3:
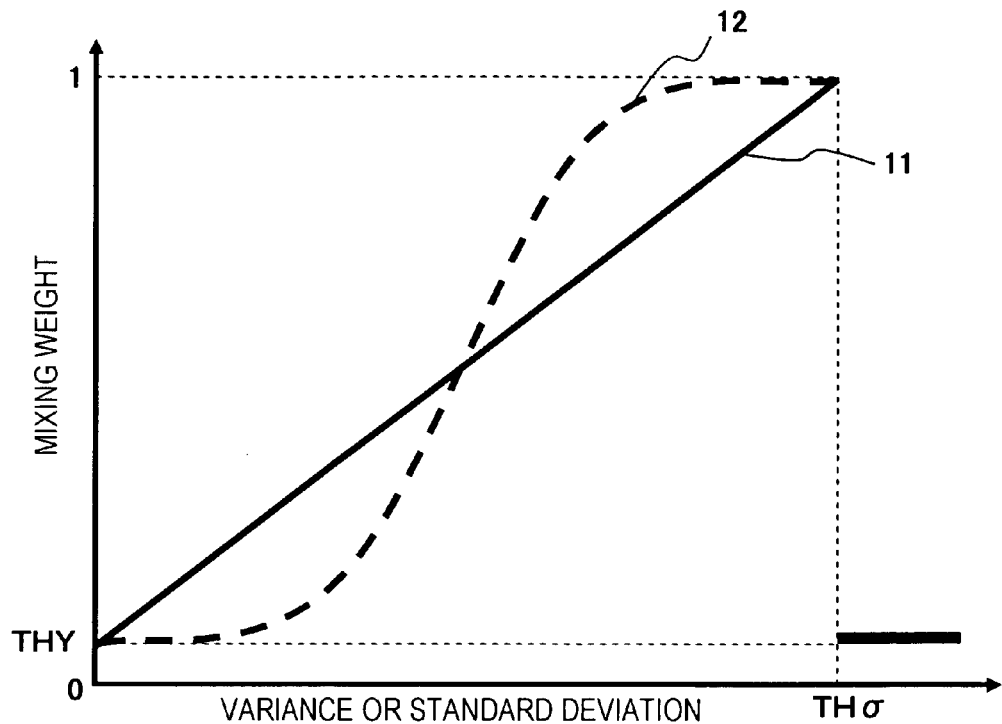
FIG. 3 is a diagram showing the relationship between variance or standard deviation and mixing weight.

FIG. 3 is a graph showing the relationship between the variation or standard deviation and the mixing weight. This graph determines the range of threshold values THT to 1 with respect to the range from 0 to THσ in variation or standard deviation. The determining method may be a linear type as indicated by a black line 11 in FIG. 3 or a triangular function type as indicated by a broken line 12 in FIG. 3.

In general, there is generally a tendency that the variance D(x, y) or standard deviation σ(x, y) of the pixel value in the matrix increases as the number of image noises increases. Therefore, the nose reducing effect can be more enhanced if the mixing ratio of the smoothened image is set to a higher value as the variance D(x, y) or the standard deviation σ(x, y) of the pixel is larger than a predetermined amount.

On the other hand, the variance or standard deviation of the matrix in the neighborhood of the contour is extremely high because the concentration rapidly varies. Therefore, it can be understood that the boundary of some structure, for example, an internal organ exists in the matrix in the neighborhood of the contour.

In such a case, if the mixing ratio of the smoothened image is reduced, priority is given to the resolution.

The starting point of THY in FIG. 3 may be set to zero. However, when THY is set to zero, there may occur a case where an unnatural boundary line (dual line) or the like occurs at the sharpened image portion in an area where rapid concentration variation exists. Accordingly, in order to prevent occurrence of this unnatural boundary line, THY is not set to zero, but it is desirable to set THY to a value which is asymptotic to zero.

Furthermore, the size (M×N) of the matrix may be arbitrary, however, it is desirable that the size is basically set to about 3×3 or 5×5 in order to remove noises while keeping the contour and the sharpness of the structure. If the size of the matrix is set to about 3×3 or 5×5, it is preferable from the viewpoint of shortening the operation time.

Next, the method of calculating the mixing weight when the analysis quantity is a Wiener spectrum will be described.

The Wiener spectrum is achieved by Fourier Transformation of auto-correlation function, and it is an analysis quantity which is generally used to estimate the granularity of the image. It is estimated that as the Wiener spectral value is lower, the granularity is more excellent.

Figure 4:
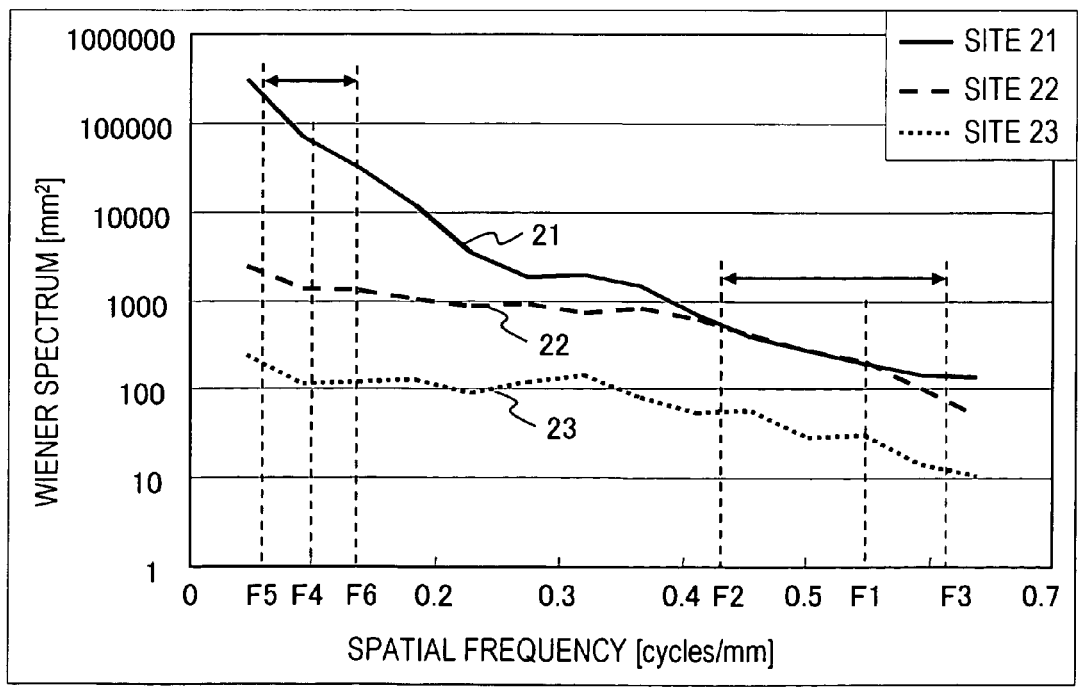
FIG. 4 is a diagram showing a Wiener spectrum at each site.

FIG. 4 shows a Wiener spectrum at each site of an abdominal CT image. The Wiener spectrum of FIG. 4 is calculated for a 32×32 matrix. Since rapid concentration variation exists in the matrix of a site 21, it is understood that the contour of a bone or the like is contained in the matrix. Since no rapid concentration variation exists in the matrix of each of sites 22 and 23, it is understood that neither contour nor structure is contained in the matrix. Furthermore, the Wiener spectral value is lower and thus the granularity is more excellent at the site 23 than that at the site 22, and thus it is understood that there is little noise in the matrix.

As is apparent from FIG. 4, the shape of the Wiener spectrum is varied in accordance with the presence or absence of the rapid concentration variation or the magnitude of the noise. The Wiener spectral value of the low frequency area is extremely high in the neighborhood of the contour because rapid concentration variation occurs there. Therefore, in the case of a matrix having a Wiener spectral value of the low frequency area which is higher than a threshold value WSTH, priority is given to the resolution, and the lowest value THY is given to the mixing weight of the smoothened image as shown in FIG. 5.

When the Wiener spectral value of the low frequency area is lower than the threshold value WSTH, priority is given to noise removal. Specifically, the mixing weight is determined so that the mixing ratio of the smoothened image is higher for a pixel having a larger Wiener spectral value as shown in FIG. 5. The threshold value WSTH is an experientially achieved Wiener spectral value in the neighborhood of the contour.

Figure 5:
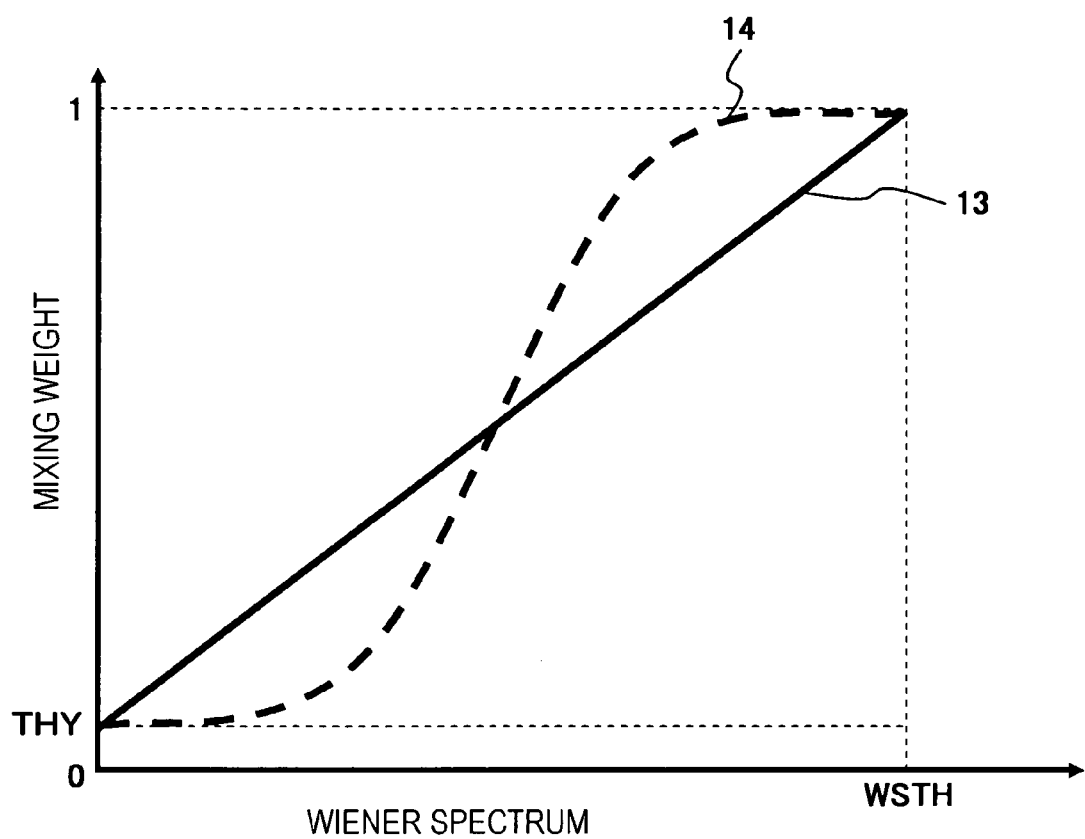
FIG. 5 is a diagram showing the relationship between variance or standard deviation and mixing weight.

The abscissa axis of FIG. 5 may be set to the Wiener spectrum of a specific frequency band as indicated by F1 of FIG. 4, or it may be set to the average value in the section from F2 to F3. The mixing weight is determined in the range from THY to 1 with respect to the Wiener spectrum. The determining method thereof may be a linear type as indicated by a black line 13 of FIG. 5 or a triangular function type indicated by a broken line 14 of FIG. 5. THY in FIG. 5 may be set to zero. However, when THY is set to zero, a sharpened image may be an unnatural boundary line (dual line) in an area where rapid concentration variation exists. Accordingly, it is desirable that THY is not set to zero, but it is set to a value asymptotic to zero. As is apparent from FIG. 4, as the noise is smaller, the Wiener spectrum is lower, and there is a tendency that the variation of the Wiener spectrum caused by rapid concentration gradient such as contour or the like appears in a low frequency area. Accordingly, when the Wiener spectrum of a specific frequency band is set to the abscissa axis of FIG. 5, the specific frequency band is desirable to be set to a high frequency area in order to accurately judge the presence or absence of the contour.

When the average value of the Wiener spectrum in a specific section is set to the abscissa axis of FIG. 5, it is desirable that the specific section is set to an area from a low frequency to an intermediate frequency in order to accurately judge the presence or absence of the contour. As the size (M×N) of the matrix is smaller, the frequency resolution of the Wiener spectrum is lowered. As the size of the matrix is larger, the effect of making the minute contour blurred is stronger.

Accordingly, when the analysis quantity is the Wiener spectrum, it is desirable that the size of the matrix is set to about 16×16 or 32×32.

Next, a method of creating a smoothened image in step 206 of FIG. 2 will be described with reference to FIG. 6.

Figure 6:
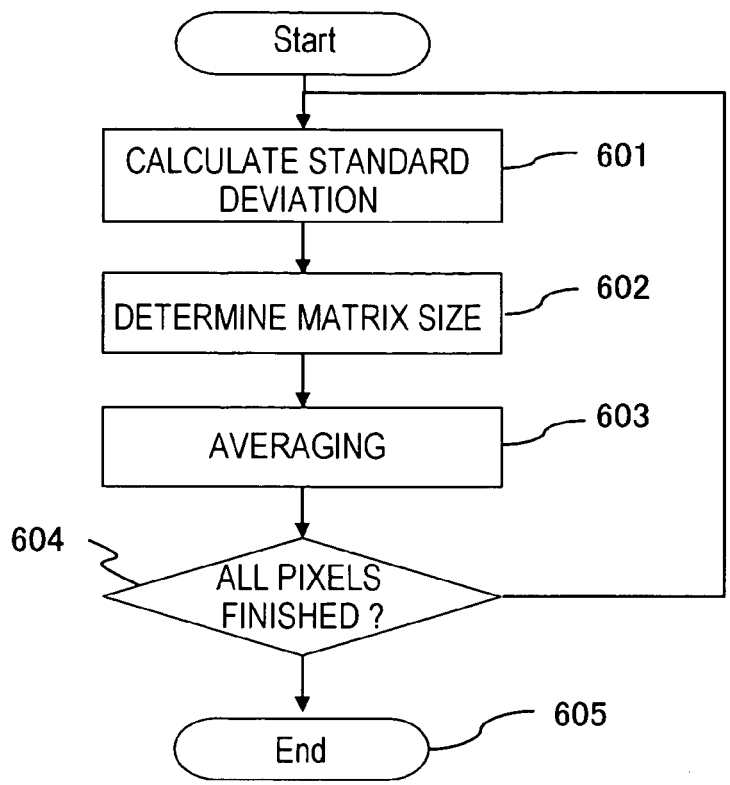
FIG. 6 is a flowchart showing a smoothening filter.

FIG. 6 is a conceptual diagram of a smoothening filter based on an analysis quantity and also is a processing flowchart. In step 601, the analysis quantity calculating means 6 calculates the standard deviation.

The calculation range of the standard deviation is preferably a 3×3 or 5×5 matrix with a pixel P(x, y) at the center of the range, however, the matrix size is not limited to that of FIG. 6.

The range described here is different from the matrix size described later, and it is tentatively determined to calculate the standard deviation.

Figure 7:
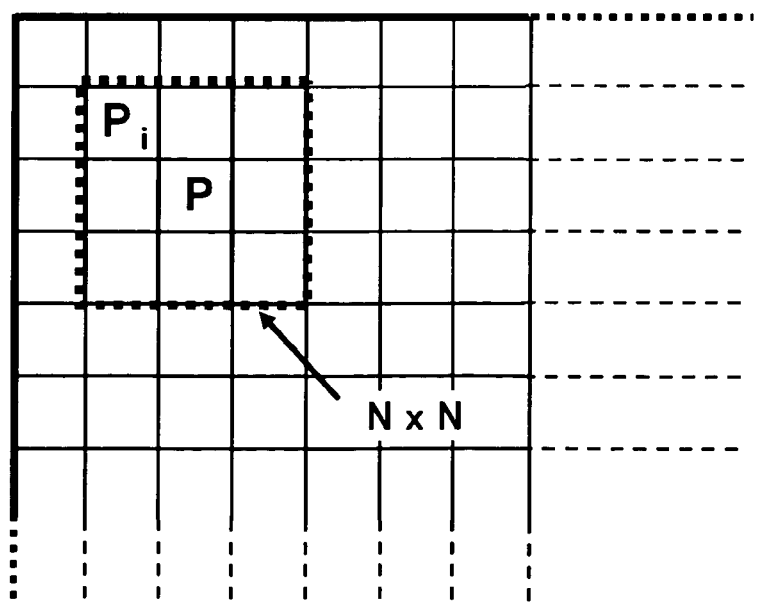
FIG. 7 is a conceptual diagram showing the smoothening filter.
Figure 8:
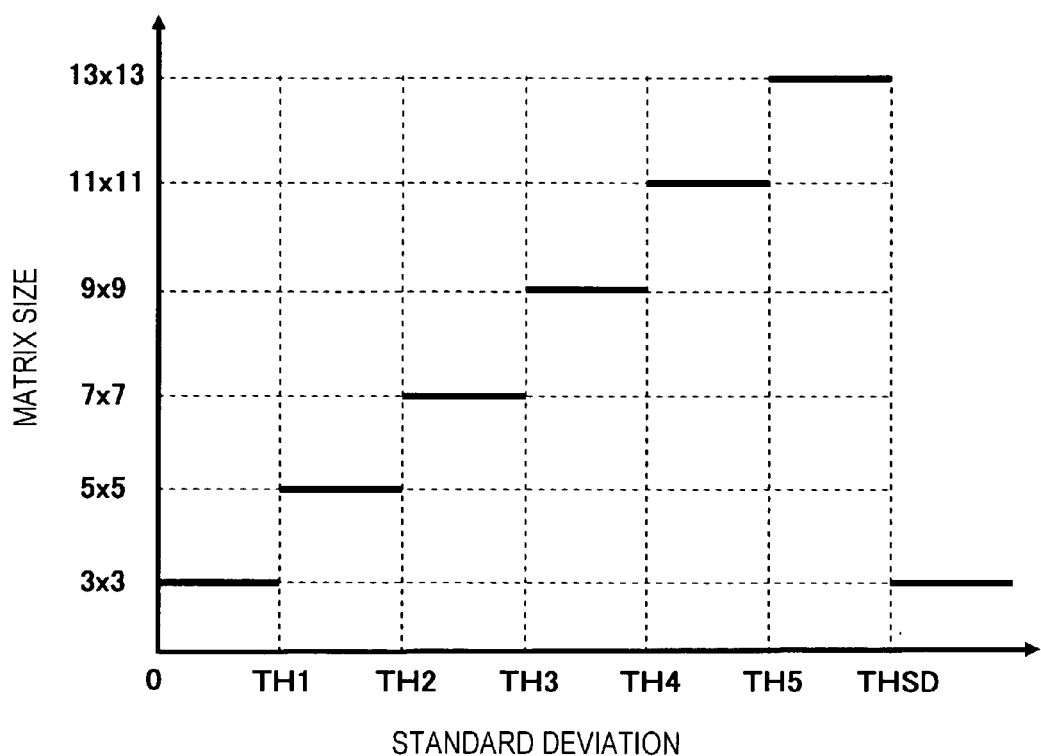
FIG. 8 is a diagram showing the relationship between standard deviation and matrix size.

In step 602, the operation processing means 2 determines the matrix size as an unit to be smoothened according to FIGS. 7 and 8 on the basis of the standard deviation calculated in step 601.

As shown in FIG. 8, the operation processing means 2 determines the matrix size so that the matrix size is larger as the standard deviation is larger. However, since the standard deviation is extremely larger at a contour portion or the like, priority is given to the resolution when the standard deviation is equal to a threshold value THSD or more and the matrix size is set to the minimum matrix size (3×3) Here, THSD is an experientially achieved standard deviation in the neighborhood of the contour.

The operation processing means 2 may set any value to TH1 to TH5, or determines them according to the following equations.

[No. 4]

$$TH1 = THSD/N$$

$$TH2 = 2 \cdot THSD/N$$

$$TH3 = 3 \cdot THSD/N \quad \text{(equation 5)}$$

$$TH4 = 4 \cdot THSD/N$$

$$TH5 = 5 \cdot THSD/N$$

N in the equation 5 represents the divisional number of the area from 0 to THSD, and in the case of FIG. 7, the division number is equal to 6. In FIG. 7, the minimum matrix size is set to 3×3, the maximum matrix size is set to 13×13, and the division number from 0 to THSD is set to 6. However, the minimum and maximum matrix sizes and the division number are not limited to these values, and they may be set to any values.

As described above, the operation processing of the analysis quantity is executed by using a large matrix size for a site containing a lot of noise and having a large standard deviation, a small matrix size for pixels containing a little noise and a small standard deviation, and the minimum matrix size for a site such as a contour or the like at which an extremely concentration variation exists.

As described above, both the effect of suppressing the reduction of the resolution and the effect of removing noises are compatible with each other. When the pixel P(x, y) is a site near to the edge of an image, the matrix may protrude from the image when the matrix size determined according to FIG. 7 is used. In this case, the processing may be executed by replacing the matrix size to another matrix size at which the matrix does not protrude.

In step 603, the operation processing means 2 applies the weighting based on the analysis quantity within a matrix which contains the pixel P(x, y) at the center thereof and is defined by the size determined in step 602 to average the pixel values, and determines the pixel value after the filtering.

The operation processing means 2 repeats the processing from the step 601 to the step 603 on all the pixels, whereby smoothening filtering processing is executed on the whole image.

Next, a method of determining the pixel value after the filtering based on the analysis quantity will be described. When the pixel value before the filtering at some coordinate (x, y) is represented by P(x, y) and the pixel value after the filtering is represented by P'(x, y), P'(x, y) is calculated according to the following equation.

[No. 5]

$$P'(x, y) = \frac{\sum_{i=x-\frac{(N-1)}{2}}^{x+\frac{(N-1)}{2}} \sum_{j=y-\frac{(N-1)}{2}}^{y=\frac{(N-1)}{2}} P(i, j) \cdot W(i, j)}{\sum_{i=x-\frac{(N-1)}{2}}^{x+\frac{(N-1)}{2}} \sum_{j=y-\frac{(N-1)}{2}}^{y+\frac{(N-1)}{2}} W(i, j)} \quad \text{(equation 6)}$$

Here, N represents the matrix size, and it is determined every pixel according to the method described above. The coordinate (i, j) represents each coordinate in the matrix, and P(i, j) represents a pixel value at the coordinate (i, j). Here, i represents an integer from x−(N−1)/2 to x+(N−1)/2, and j represents an integer from y−(N−1)/2 to y+(N−1)/2. Accordingly, if the matrix size is set to 3×3, i, j are equal to −1, 0, 1, and if the matrix size is set to 5×5, i, j are equal to −2, −1, 0, 1, 2. Furthermore, W(i, j) represents weighting when the pixel values are averaged, and it is determined according to the following equation.

[No. 6]

$$W(i, j) = \left\{1 - \left(\frac{P(i, j) - P(x, y)}{\alpha \cdot \sigma}\right)\right\}^2 \quad \text{(equation 7)}$$

In the equation 7, σ represents the standard deviation, and the above value calculated in the step 601 of FIG. 6 may be used as the standard deviation. Furthermore, α represents any value for determining the smoothening degree, and the smoothening degree is higher and thus the noise removing effect is more enhanced as α is set to a larger value. The weight W(i, j) for the averaging in the equation 7 is determined in accordance with the difference or variance (standard deviation) of pixel values, that is, the similarity of the pixel values, and the weighting is increased as the similarity is higher. Accordingly, as the pixel values are more similar to one another, larger weighting is applied to the pixel values to average the pixel vales in the equation 6. Therefore, it can be more expected to suppress the reduction of the resolution by the averaging as compared with the conventional smoothening filter. Accordingly, if the operation processing means 2 settles α and determines the weighting according to the equation 7 so that a sufficient noise removing effect can be expected, and executes the processing according to the equation 6, both the effect of suppressing the reduction of the resolution and the effect of removing noises are compatible with each other. In the equation 7, W(i, j) is determined in accordance with the similarity of the pixel values. The operation processing means 2 may be determined in accordance with the similarity of the pixel values and the distance from the center pixel as in the case of the equation 8. In this case, the same effect as when the weighting is determined according to the equation 7 can be expected.

[No. 7]

$$W(i, j) = \frac{1}{\sqrt{(x-i)^2 + (y-j)^2}} \left\{1 - \left(\frac{P(i, j) - P(x, y)}{\alpha \cdot \sigma}\right)\right\}^2 \quad \text{(equation 8)}$$

The flowchart shown in FIG. 2 can be automatically executed by the operation processing means 2 shown in FIG. 1, for example.

Next, as an applied case of the first embodiment, a mixed image for which the reduction of the resolution is suppressed while the signal-to-noise ration (S/N ratio) is enhanced will be described in comparison with the prior art.

Figure 14:
FIG. 14 is a diagram showing an image in which image noises are conspicuous.

FIG. 14 shows a sample image of a CT image in which the signal-to-noise ratio is not excellent and image noise is conspicuous.

Figure 15:
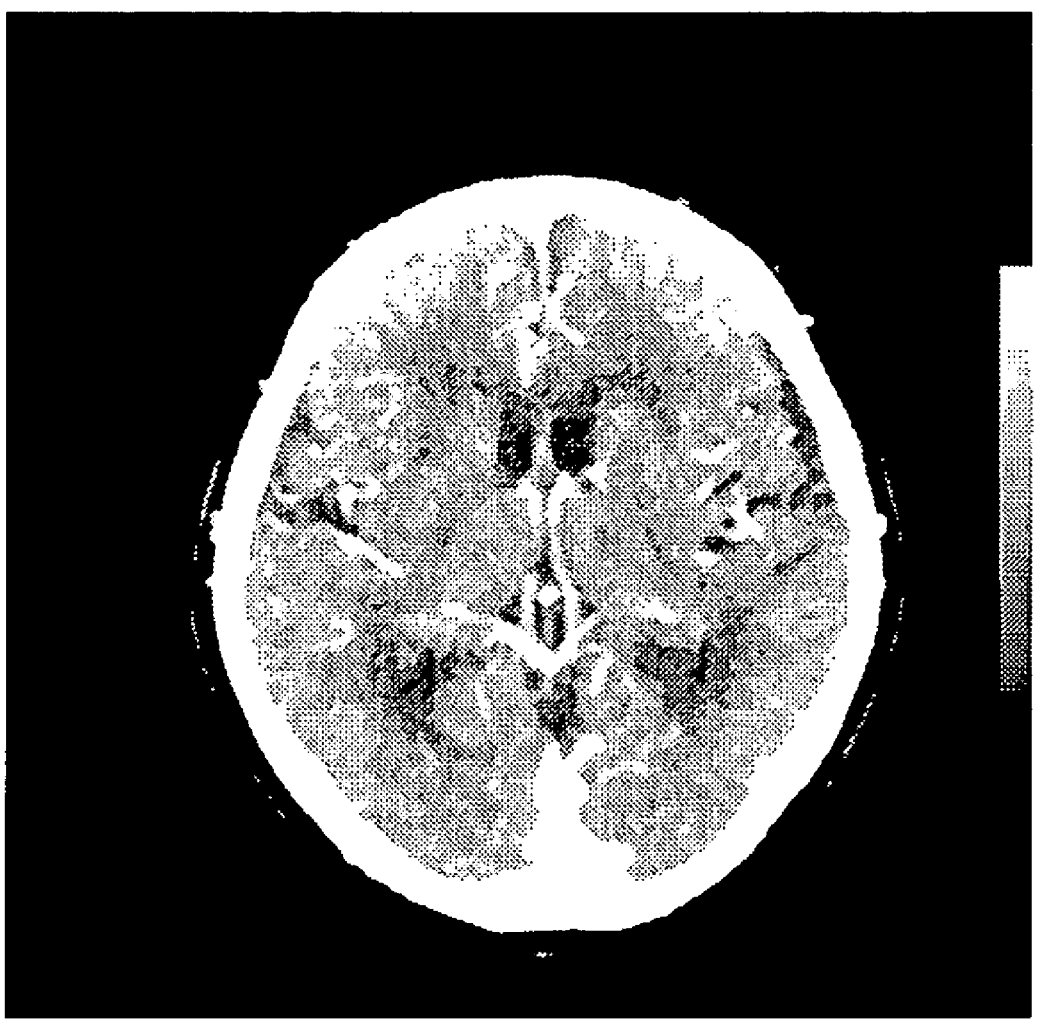
FIG. 15 is a diagram showing an example of an image to which a conventional techniques is applied.

FIG. 15 is a sample image when the noise is reduced by applying a prior art (moving average filter) to the image of FIG. 14.

Figure 16:
FIG. 16 is a diagram showing an example of an image to which the present invention is applied.

On the other hand, FIG. 16 is a sample image in the case where the embodiment 1 of the invention is applied to the image of FIG. 14 for noise reduction. As compared between FIGS. 15 and 16, the noise of FIG. 14 is removed in FIG. 15, however, the resolution is reduced and the sharpness of the image is also reduced.

On the other hand, it is apparent from FIG. 16 that the noise of FIG. 14 is clearly reduced, and the same level of resolution as the original image can be maintained.

As described above, according to this embodiment, both the noise removal and the maintenance of the resolution are compatible with each other, and the state optimal to reproduce the image can be provided.

Second Embodiment

Figure 9:
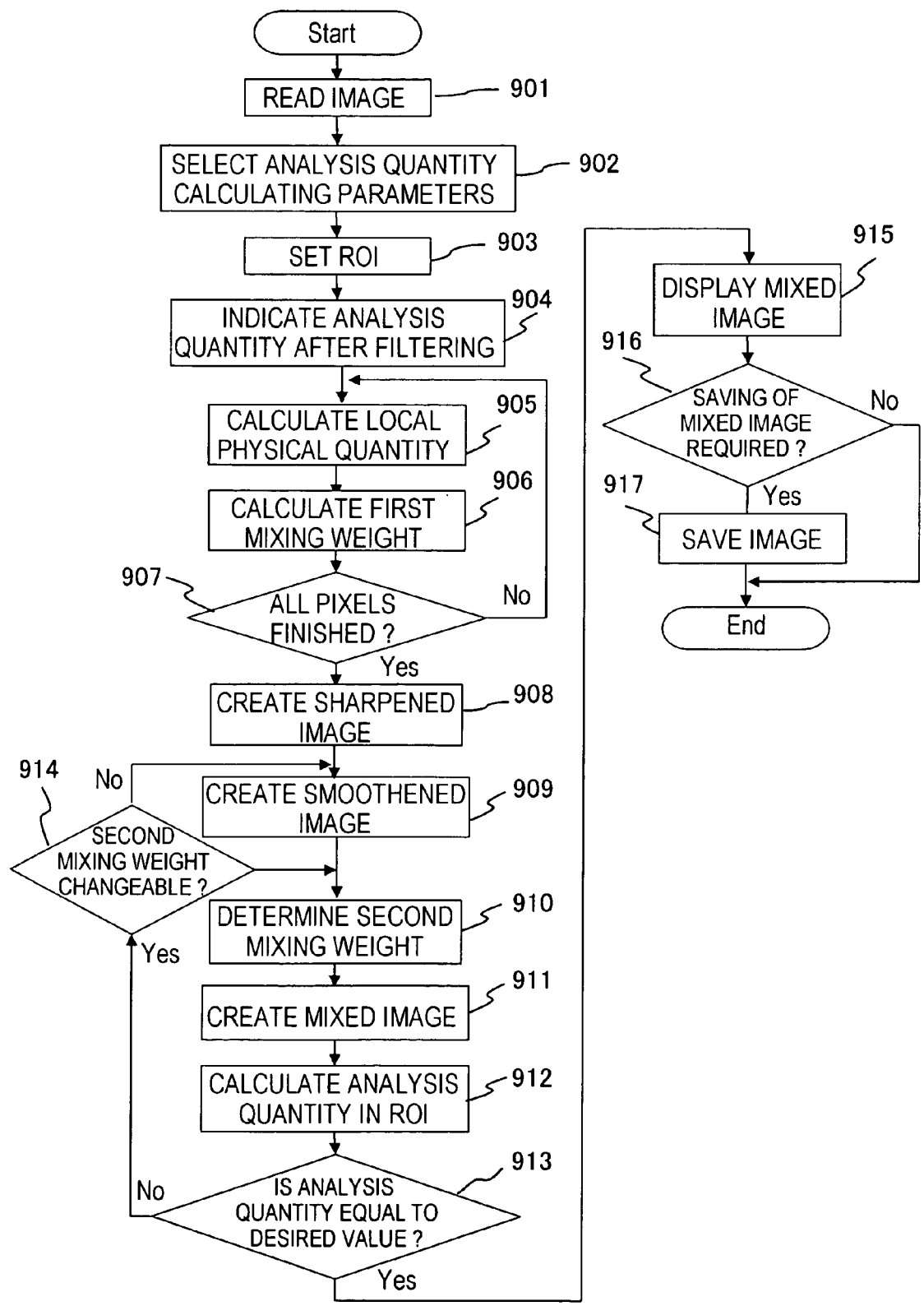
FIG. 9 is a flowchart from image reading till image storage in a second embodiment.

FIG. 9 is a flowchart showing the process from data reading till display of an output image in a second embodiment of the image processing device according to the present invention.

The different point from the first embodiment resides in that plural mixing weights such as a mixing weight for the image within a region of interest of an image and a second mixing weight for the overall image are applied.

In step 901, the operation processing means 2 reads an image to be processed, and stores it into the saving means 9. At this time, the operation processing means 2 may read an image which has been already stored in the storing means 8, and then stores it, or read digital image data which are newly created by a CT apparatus, a digital camera or the like as in the case of the first embodiment. In step 902, the operation processing means 2 displays on the image display means 3 various kinds of parameters for calculating the analysis quantity serving as the origin of the mixing ratio between the smoothened image and the sharpened image, and the operator selects from the various kinds of parameters thus displayed through the input means 10. As described with respect to the first embodiment, all the parameters are the analysis quantity reflecting the granularity of the image.

The matrix size indicates a range in which the analysis quantity is calculated. For example, the operation processing means 2 indicates 3×3 matrix or 5×5 matrix around some pixel as the parameters for calculating the analysis quantity.

Furthermore, as in the case of the first embodiment, the shape of the matrix is not required to be a square.

Here, the parameters for calculating the analysis quantity may be freely indicated by the operator, or they may be preset. When the parameters are preset, the step 902 may be omitted.

In step 903, the operator sets a region of interest (hereinafter referred to ROI) on an image before filtering through the input means 10.

At this time, it is desirable that the operation processing means 2 also calculates the analysis quantity within ROI, and it is displayed together with the image on the image display means 3.

In step 904, the operator indicates through the input means 10 a desired value which the analysis quantity in ROI of the image after the filtering should take.

For example, when the analysis quantity is a variance or standard deviation, the operator inputs any variable or standard deviation value via an user interface through the input means 10.

When an image to be processed is a CT image and it is required to create the image corresponding to an image picked up with a radiation dosage of k times by the filtering, a variance value which is 1/k time of the present value or a standard deviation value corresponding to the double of the present value may be indicated.

Figures 10, 11:
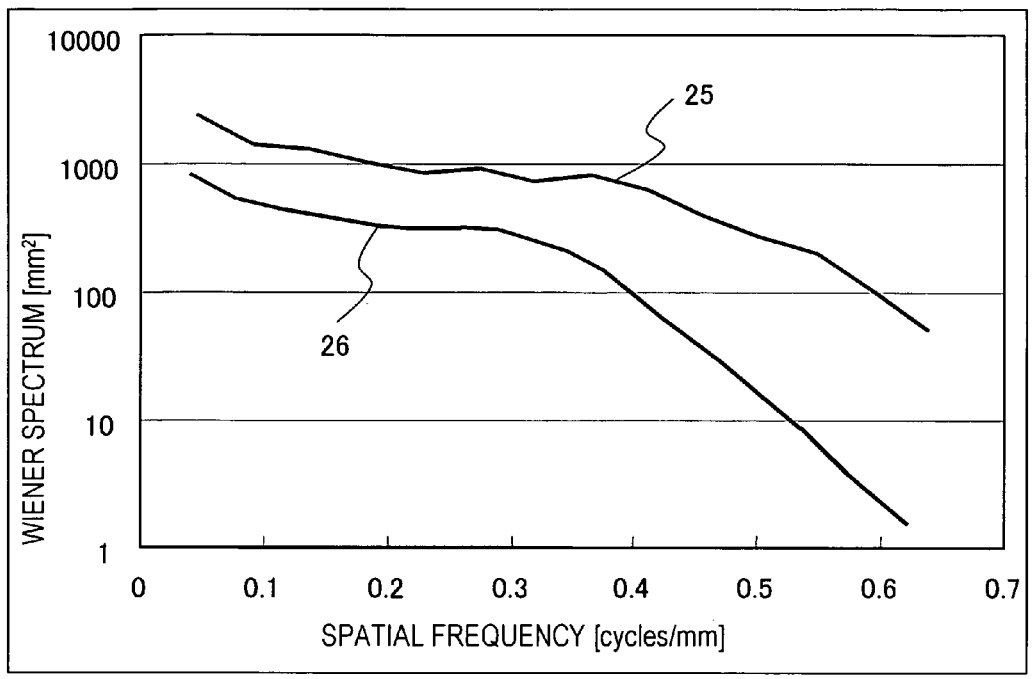
FIG. 10 is a diagram showing the setting of a Wiener spectrum of an original image and a desired Wiener spectrum in some ROI.
FIG. 11 is a diagram showing an example of a lookup table for determining an initial value of second mixing weight when an analysis quantity is variation or standard deviation.

Furthermore, when the analysis quantity is the Wiener spectrum, a Wiener spectrum 25 before the filter as shown in FIG. 10 may be displayed on the image display means 3, and the operator may indicate a Wiener spectrum 26 having a desired shape on a graph through the input means 10.

In this case, the operator changes or sets the shape of the Wiener spectrum in ROI by a graphical user interface (GUI) through the input means 10.

The value indicated here is indicated so that the inside of ROI to which most importance is attached in the image has a desired analysis quantity.

In step 905, the analysis quantity calculating means 6 calculates the analysis quantity in the matrix having each pixel at the center thereof on the basis of the parameters determined in step 902.

Here, a well-known method may be used as the calculation method of the variance, the standard deviation and the Wiener spectrum as the analysis quantity.

In step 906, a first mixing weight W1 (x, y) is calculated on the basis of the analysis quantity calculated in step 905 by the image mixing means 7.

The calculation method of the first mixing weight may be identical to the calculation method of the mixing weight according to the first embodiment.

The first mixing weight is determined every pixel, and the operation processing means 2 repeats the steps 905 to 906 until the calculation on all the pixels is finished in step 907.

The operation processing means 2 goes to the next step when the calculation on all the pixels is finished.

In step 908, the operation processing means 2 carries out the edge enhancement processing on the original image to be processed by using the sharpened image creating means 5.

The edge enhancement processing is identical to the method described with reference to the first embodiment.

In step 909, the operation processing means 2 executes the noise removing processing on the original image to be processed by using the smoothened image creating means 4. The noise removing processing may be identical to the method described with reference to the first embodiment.

In step 910, the operation processing means 2 determines the initial value of the second mixing weight W2 on the basis of the analysis quantity in ROI of the original image indicated in step 903 by the operator and the desired analysis quantity value in ROI of the mixed image determined in step 904.

The method of determining the initial value of the second mixing weight will be described later.

In step 911, the image mixing means 7 mixes the smoothened image AIMG(x, y) and the sharpened image BIMG(x, y) on the basis of the first mixing weight achieved in step 906 and the second mixing weight achieved in step 910 according to the equation 9 to create a mixed image OIMG(x, y).

[No. 8]

$$OIMG(x,y) = W2 \cdot W(x,y) \cdot AIMG(x,y) + (1 - W2 \cdot W1(x,y)) \cdot BIMG(x,y) \quad \text{(equation 9)}$$

In step 912, the operation processing means 2 calculates the analysis quantity in ROI of the mixed image OIMG(x, y).

In step 913, the operation processing means 2 judges whether the analysis quantity in ROI calculated in step 912 is coincident with the value indicated in step 904, and goes to the next step if both the values are coincident with each other.

If step 914, when both the values are not coincident with each other, if the mixing weight does not reach the limit (0 or 1), the operation processing means 2 repeats the processing from the step 910 to 912 until the calculated analysis quantity is coincident with the desired value indicated in step 904 while properly changing the value of the second mixing weight. If the mixing weight reaches the limit, the operation processing means 2 repeats the processing from the steps 909 to 912 until the calculated analysis quantity is coincident with the desired value indicated in step 904.

Here, the smoothening level indicates the matrix size when the moving average filter or the intermediate value filter is used for the smoothening filter, and also indicates α in the equation 7 when the smoothening filter based on the analysis quantity described above is used.

Even when the operation processing means 2 repeats the processing from the steps 910 to 912 or from the steps 909 to 912, there may be a case where the calculated analysis quantity is not perfectly coincident with the desired value indicated in step 904.

In this case, the operation processing means 2 may repeat the processing from the steps 910 to 912 or from the steps 909 to 912 until the error from the desired value indicated in step 904 is converged into any range (for example, 5%).

Furthermore, the operation processing means 2 may fix the repetitive frequency of the processing from the steps 910 to 912 or the steps 909 to 912, and create a mixed image so that the error from the desired value is minimum in the repetitive processing. In step 915, the operation processing means 2 displays the mixed image OIMG(x, y) created in step 912 on the image display means 3. In step 916, the operation processing means 2 judges whether it is necessary to store the mixed image or not. The operation processing means 2 stores, if necessary, the mixed image in the image storing means 8 in step 917.

Next, the method of determining the initial value of the second mixing weight will be described. First, the method when the analysis quantity is the variance or the standard deviation will be described. When a smoothened image created by a specific smoothening filter and a sharpened image created by a specific sharpening filter with respect to an original image having some variance or standard deviation are mixed with each other in some ratio, the variance and the standard deviation of the mixed image are uniquely determined. When a table of these values is made, a lookup table as shown in FIG. 11 can be created. The method of determining the initial value of the second mixing weight by using the lookup table will be described.

For example, the variance or standard deviation value in ROI of the original image is achieved in step 903 of FIG. 9, and a desired variance or standard deviation value in ROI of the mixed image is indicated in step 904 of FIG. 9. A value at the cross point between a corresponding variance or standard deviation value in ROI on the ordinate axis of the lookup table of FIG. 11 and a corresponding desired variance or standard deviation value in ROI of the mixed image on the abscissa axis is set as the initial value of the second mixing weight.

In FIG. 11, the lookup table has a sampling interval of 0.5 with respect to the variance and the standard deviation. However, the sampling interval is not limited to this value, and it may be set to any value.

Figures 12, 13:
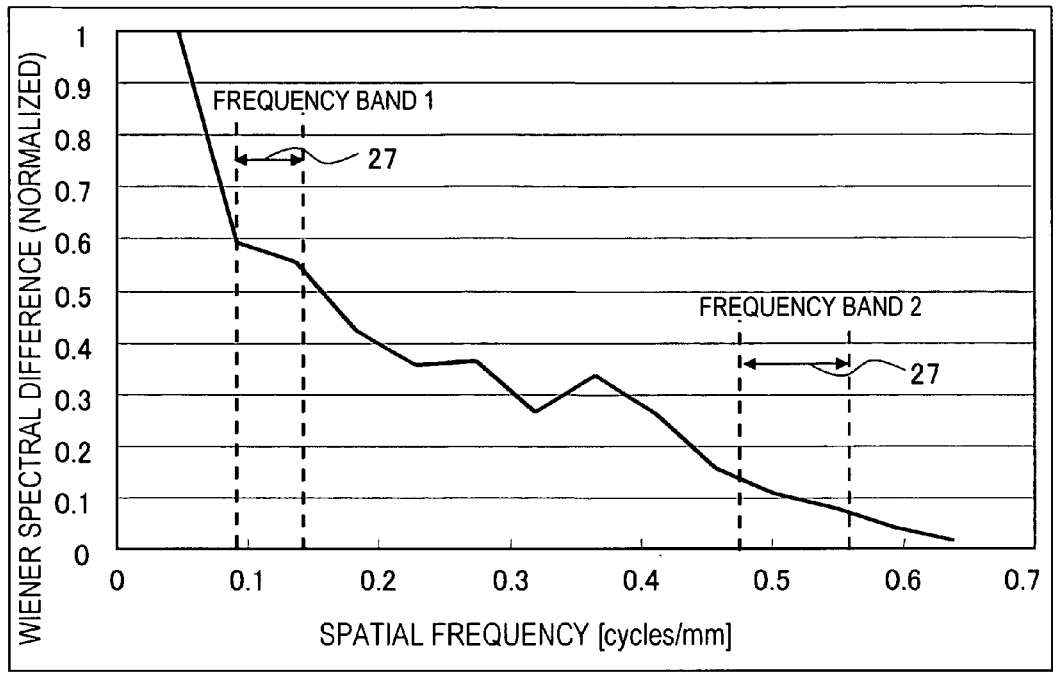
FIG. 12 is a diagram showing an example of the standardized difference between the Wiener spectrum of the original image and the desired Wiener spectrum in some ROI.
FIG. 13 is a diagram showing an example of a lookup table for determining an initial value of second mixing weight when the analysis quantity is a Wiener spectrum.

Next, the method of determining the initial value of the second mixing weight when the analysis quantity is the Wiener spectrum will be described. When the Wiener spectrum of the original image and the desired Wiener spectrum are differentiated from each other and normalized by 1, the result as shown in FIG. 12 is achieved. When a smoothened image created by a specific smoothening filter and a sharpened image created by a specific sharpening filter with respect to an original image having some Wiener spectrum are mixed with each other in some mixing ratio, each frequency component value of the difference in Wiener spectrum between the original image and the mixed image is uniquely determined. Accordingly, a lookup table as shown in FIG. 13 can be created. A Wiener spectrum in ROI of the original image is achieved in step 803 of FIG. 9, and a desired wiener spectrum of the mixed image is indicated in step 804 of FIG. 9. Therefore, these Wiener spectra are differentiated and normalized, and then the differentiated and normalized result is applied to the lookup table of FIG. 13 with respect to two frequency bands 27 and 28 to determine the initial value of the second mixing weight. In FIG. 13, the lookup table has a sampling interval of 0.1 with respect to the difference of the Wiener spectra. However, the sampling interval is not limited to this value, and it may be set to any value.

The flowchart shown in FIG. 9 can be automatically executed by the operation processing means 2 of FIG. 1.

Next, the result of suppressing the reduction of the resolution while enhancing the signal-to-noise ratio (S/N ratio) when the second embodiment is applied will be described in comparison with that of the prior art.

Figure 17:
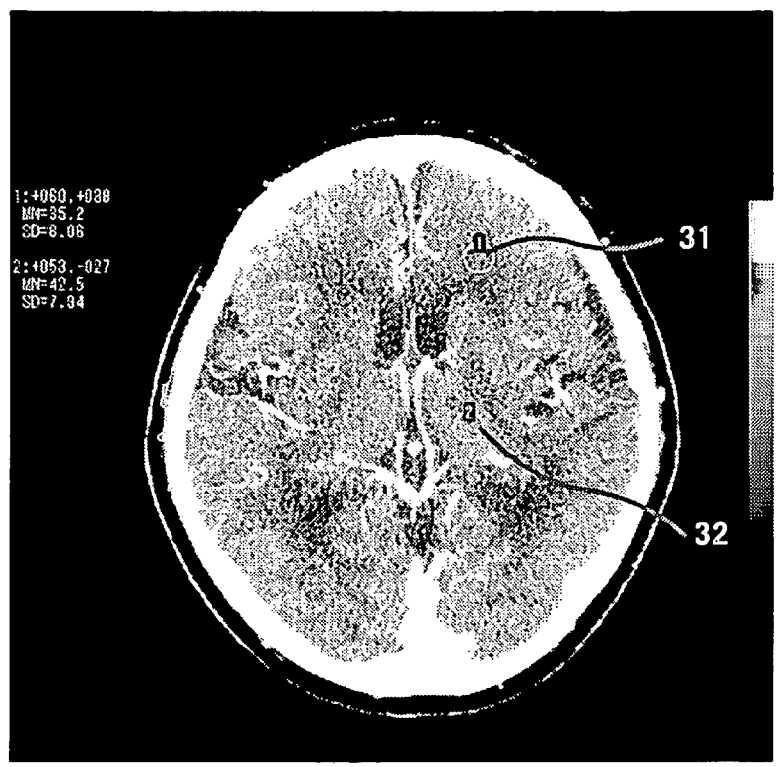
FIG. 17 is a diagram showing an conventional image having some standard deviation value.

FIG. 17 shows a sample of an CT image when the standard deviation in ROI 31, 32 is equal to about 8.

Figure 18:
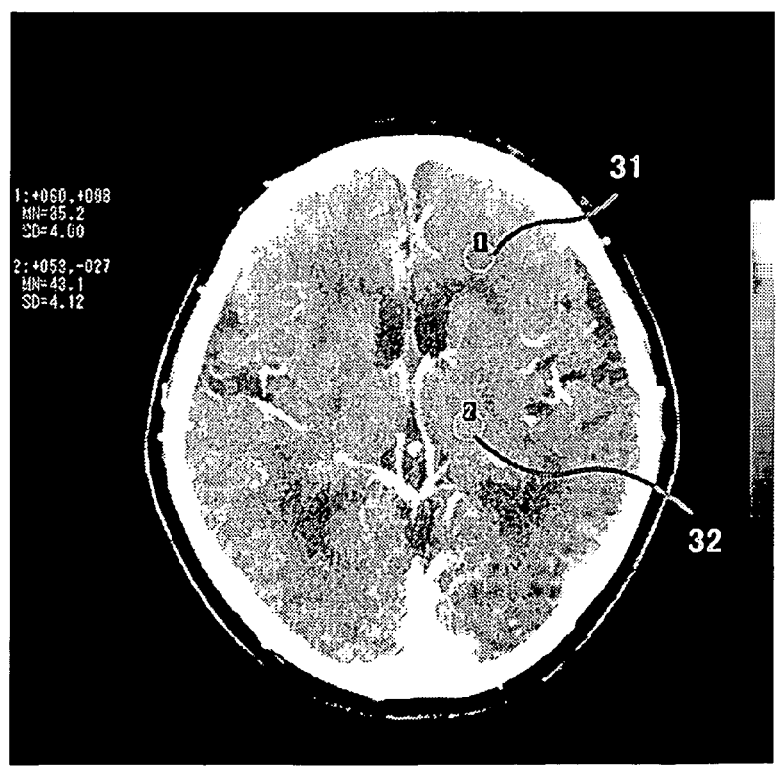
FIG. 18 is a diagram showing an example of the image of FIG. 17 to which the present invention is applied.

FIG. 18 shows a sample image achieved by applying the second embodiment of the present invention to the image of FIG. 17 when the standard deviation value is set to 4.

From FIG. 18, it is apparent that there is achieved a desired analysis quantity image for which noise is reduced while suppressing the reduction of the resolution.

According to the present invention, when the signal-to-noise ratio of digital image data is enhanced, the image noise can be reduced while suppressing the reduction of the resolution.

Furthermore, there is also an effect that an image having a desired analysis quantity can be crated in a desired region of interest.

The embodiments described above are examples, and they are contained in the scope of the present invention even when they are implemented independently of one another or in combination with each other.

INDUSTRIAL APPLICABILITY

According to the image processing device and method of the present invention, when images of a subject are collected, the signal-to-noise ratio (S/N ratio) of the collected image data can be enhanced, and the reduction of the resolution of the collected images can be suppressed.

The invention claimed is:

1. An image processing device including image creating means for creating each of a smoothened image and a sharpened image with respect to at least a part of pixel-based image data for a medical image, and mixed image creating means for mixing the smoothened image and the sharpened image created by the image creating means to create a mixed image, comprising:

analysis quantity calculating means for calculating for each of plural pixels in the image data an analysis quantity based on a matrix that surrounds each pixel of the image data and has any matrix size;

control means for controlling a mixing ratio between the smoothened image and the sharpened image in the mixed image creating means in accordance with the analysis quantity calculated by the analysis quantity calculating means; and display means for displaying the mixed image that is controlled by the control means and output from the mixed image generating means;

wherein the image creating means creates the smoothened image with changing an averaging weight in accordance with at least one of a similarity of pixel values in a smoothening matrix and a distance from a center pixel to average pixel values in the smoothening matrix.

2. The image processing device according to claim 1, wherein the image data are medical digital image data containing an X-ray perspective image, a CT image, an MR image or an ultrasonic image, or digital image data achieved by an image achieving device containing a digital camera or a scanner.

3. The image processing device according to claim 1, wherein the analysis quantity calculated by the analysis quantity calculating means is at least one of a variance value, a standard deviation value and a Wiener spectral value of an image, and a differential value between a noted pixel value and pixel values of pixels located around the noted pixel.

4. The image processing device according to claim 1, further comprising means for arbitrarily setting the processing order of the calculation of the mixing ratio between the smoothened image and the sharpened image in the image mixing processing, the smoothened image creation and the sharpened image creation.

5. The image processing device according to claim 4, wherein the processing order setting means sets the processing order so that the mixing ratio calculation, the smoothened image creation and the sharpened image creation are performed in parallel processing style.

6. The image processing device according to claim 1, wherein the mixing ratio between the smoothened image and the sharpened image in the image mixing processing is set to a linear type or triangular function type.

7. The image processing device according to claim 1, wherein the image creating means creates the smoothened image with changing the smoothening matrix size in accordance with the standard deviation of the image data for respective pixels of the image data.

8. The image processing device according to claim 7, further comprising: means for automatically adjusting at least one of averaging level comprising the smoothening matrix size of the image smoothening means and an averaging weight coefficient and the mixing ratio between the smoothened image and the sharpened image in the image mixing means in accordance with an analysis quantity in some region of interest of the mixed image so that the analysis quantity in the desired region of interest of the mixed image is equal to a desired value.

9. The image processing device according to claim 8, further comprising a graphical user interface that displays a Wiener spectrum in the region of interest on the display means and can freely change or set the shape of the Wiener spectrum.

10. An image processing method including an image creating step for creating each of a smoothened image and a sharpened image with respect to at least a part of pixel-based image data for a medical image, and a mixed image creating step for mixing the smoothened image and the sharpened image created by the image creating step to create a mixed image, comprising:
an analysis quantity calculating step for calculating for each of plural pixels of the image data an analysis quantity based on a matrix of plural pixels that surrounds the pixel of the medical image data and has any matrix size;
a control step for controlling a mixing ratio between the smoothened image and the sharpened image in the mixed image creating step in accordance with the analysis quantity calculated by the analysis quantity calculating step; and
a display step for displaying the mixed image that is controlled by the control step and output from the mixed image generating step;
wherein the image creating step creates the smoothened image with changing an averaging weight in accordance with at least one of similarity of pixel values in a smoothening matrix and a distance from a center pixel to average plural pixel values in the smoothening matrix.

11. The image processing step according to claim 10, wherein the image data are medical digital image data containing an X-ray perspective image, a CT image, an MR image or an ultrasonic image, or digital image data achieved by an image achieving device containing a digital camera or a scanner.

12. The image processing method according to claim 10, wherein the analysis quantity calculated by the analysis quantity calculating step is at least one of a variance value, a standard deviation value and a Wiener spectral value of an image, and a differential value between a noted pixel value and pixel values of pixels located around the noted pixel.

13. The image processing method according to claim 10, further comprising arbitrarily setting the processing order of the calculation of the mixing ratio between the smoothened image and the sharpened image in the image mixing processing, the smoothened image creation and the sharpened image creation.

14. The image processing method according to claim 13, including setting the processing order so that the mixing ratio calculation, the smoothened image creation and the sharpened image creation are performed in parallel processing style.

15. The image processing method according to claim 10, wherein the mixing ratio between the smoothened image and the sharpened image in the image mixing processing is set to a linear type or triangular function type.

16. The image processing method according to claim 10, wherein the image creating step creates the smoothened image with changing a smoothening matrix size in accordance with the standard deviation of the image data for every pixel of the image data.

17. The image processing method according to claim 16, further comprising: a step for automatically adjusting at least one of averaging level comprising the smoothening matrix size of the image smoothening step and an averaging weight coefficient and the mixing ratio between the smoothened image and the sharpened image in the image mixing step in accordance with an analysis quantity in some region of interest of the mixed image so that the analysis quantity in the desired region of interest of the mixed image is equal to a desired value.

18. The image processing method according to claim 17, further comprising providing a graphical user interface that displays a Wiener spectrum in the region of interest on the display step and can freely change or set the shape of the Wiener spectrum.

19. An image processing method comprising:
a step of calculating, for each of plural pixels of pixel-based image data for a medical image, an analysis quantity based on a matrix of plural pixel values that surrounds the pixel in the pixel-based image data and has any size;
a step of creating a smoothened image and a sharpened image with respect to at least a part of the pixel-based image data for a medical image in accordance with the analysis quantity calculated by the analysis quantity calculating step;
a step of mixing the smoothened image and the sharpened image to thereby create a mixed image; and
a display step of displaying the mixed image mixed in the mixing step;
wherein the smoothened image is created with changing an averaging weight in accordance with at least one of similarity of pixel values in a smoothening matrix and a distance from a center pixel to average plural pixel values in the smoothening matrix.

20. An image processing device comprising:
a digital computer configured to receive pixel-based image data for a medical image and calculate therefrom (i) a smoothened image by removing noise present in the medical image, (ii) a sharpened image emphasizing contours in the medical image, and (iii) a respective analysis quantity calculated for each pixel in the image data based on a matrix that surrounds the pixel and has a selected matrix size;
said computer being configured to calculate the smoothened image by applying a multi-pixel smoothening matrix on a pixel-by-pixel basis to said image data for the medical image to thereby calculate pixel values of said smoothened image, using averaging weighting applied to the pixel values of the image data that are within a smoothening matrix such that the averaging weighting is increased when the pixel values of the image data that are within the smoothening matrix are more similar to each other but the averaging weighting is decreased when the pixel values of the image data that are within the smoothening matrix are less similar to each other;
said computer being configured to calculate said respective analysis quantity for each pixel in the image data based a matrix that surrounds each pixel of the image data and has a selected matrix size;
said computer being further configured to mix the smoothened and sharpened images in a mixing ratio related to the respective analysis quantity calculated for each pixel in the image data to thereby create a pixel-based mixed image; and
a display unit coupled with said computer and configured to receive therefrom and display said mixed image,
wherein the computer calculates the smoothened image with changing an averaging weight in accordance with at least one of a similarity of pixel values in a smoothening matrix and a distance from a center pixel to average pixel values in the smoothening matrix.

21. The image processing device of claim 20 wherein said computer is configured to vary a size of said smoothening matrix with standard deviation of the pixel values of pixels in the image data such that the smoothening matrix has a larger size where the pixel values of the image data have a higher standard deviation and thus contain more noise but the smoothening matrix has a smaller size where the pixel values of the image data have a smaller standard deviation and thus contain less noise.

* * * * *